H. MIGEON.
Beer Cooler.
No. 1,266. Reissued Jan. 28, 1862.
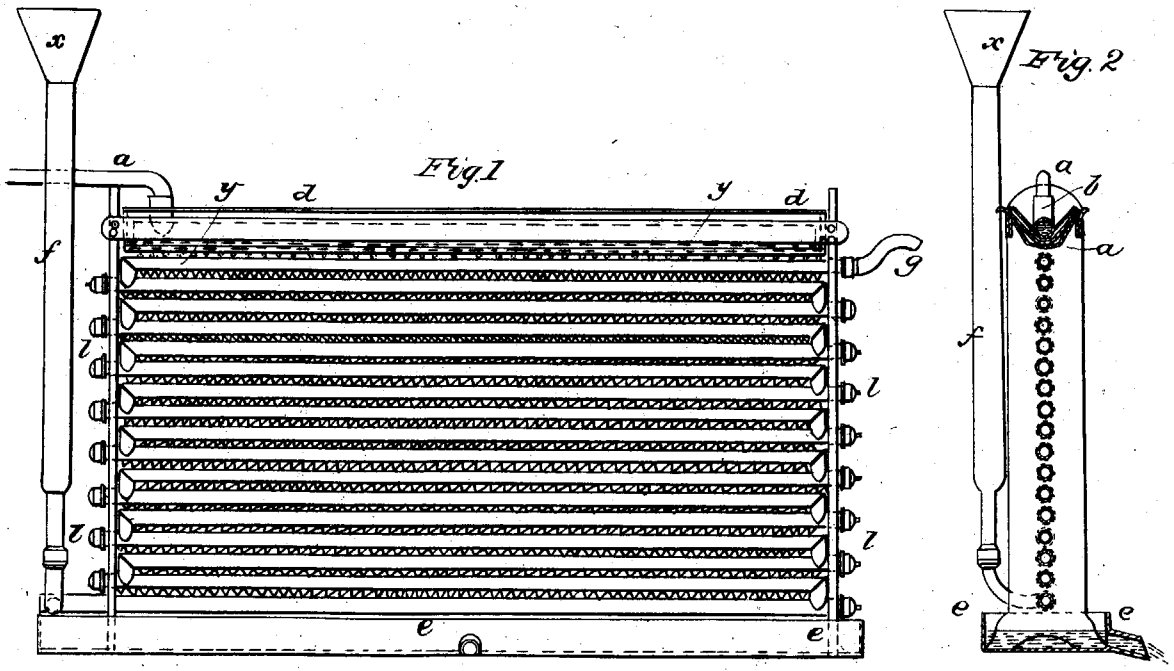
WITNESSES
Lemuel W. Serrell
Thos. Geo. Harold
INVENTOR
H. Migeon
N. PETERS, Photo-Lithographer, Washington, D. C.

UNITED STATES PATENT OFFICE.

HENRY MIGEON, OF WOLCOTTVILLE, CONNECTICUT, ASSIGNEE OF JEAN LOUIS BAUDELOT.

IMPROVEMENT IN APPARATUS FOR COOLING BEER AND OTHER LIQUIDS.

Specification forming part of Letters Patent No. 25,992, dated November 1, 1859; antedated April 13, 1856; Reissue No. 1,266, dated January 28, 1862.

DIVISION No. 2.

*To all whom it may concern:*

Be it known that I, HENRY MIGEON, of Wolcottville, in the county of Litchfield and State of Connecticut, do hereby declare the following to be a full, clear, and exact description of an Improved Means for Cooling Beer and other Liquids invented by JEAN LOUIS BAUDELOT, of Harancourt, in the Empire of France, and of whom I am assignee.

The nature of this division of the said invention consists in providing on the lower side of the pipes, in a vertical range of horizontal pipes, downward projections which serve to conduct the beer or other liquid to be cooled in a thin film from one pipe to the next below it, whereby the liquid to be cooled is more uniformly distributed and the contact thereof with the whole surface of the cooler maintained.

It also consists in providing a trough with perforations supplying the liquid to be cooled, when combined with a screen or perforated receptacle within said trough, for detaining any foreign substances, or for equalizing the distribution in said trough of the liquid to be cooled, as hereinafter set forth.

In the accompanying drawings, Figure 1 is an elevation of the said apparatus for cooling beer or other liquids, and Fig. 2 is a cross-section of the same.

Similar marks of reference denote the same parts.

In these figures a vertical range of horizontal or nearly horizontal pipes is shown, and these connect at alternate ends with the next pipe above. The lowest pipe in the range connects with the supply-pipe *f*, that rises higher than the top pipe in said range, and the water or other cooling-liquid is to be supplied through this pipe from any suitable reservoir or other source; and *x* is a funnel-shaped end that may be provided to facilitate the introduction of said cooling liquid. The upper pipe, *y*, of said range terminates with an elevated nozzle, *g*, from which the cooling-liquid is discharged after traveling back and forth in said vertical range of horizontal pipes.

The beer or other liquid to be cooled is supplied through the pipe *a* from any suitable kettle or other vessel, and passes the entire length of the apparatus in the perforated pipe *b*, so as to distribute uniformly, and the beer passing from said pipe through the perforations falls into the trough *d*, that is perforated with a row of five holes along the bottom directly over the upper pipe of said vertical range of horizontal pipes. The said trough *t* is to be provided with a screen to retain any scum, loose hops, &c., and at *c* a trough is shown within said trough *d* with very fine wire-gauze at the bottom part thereof for the aforesaid purpose. The lower side of each pipe in the said vertical range of horizontal pipes is provided with projections, which are shown in the form of teeth, made by soldering a notched strip of metal to the under side of each pipe. These serve as conductors for the liquid falling successively from one tube to another; and at the end of the pipes plugs should be provided, which may be removed for the purpose of cleaning the pipes.

*e* is a trough or receptacle for the beer or other liquid as it falls away from said range of pipes.

It will now be seen that the beer or other liquid to be cooled is distributed with uniformity the entire length of the apparatus, whether there is a large or small quantity of said liquid supplied, because the perforations of the pipe or of the screen *c*, or both, cause a sufficient detention to ensure a uniform and equal distribution of the liquid in the trough *d* below; hence the liquid to be cooled will run over the cooling apparatus with uniformity, whether passing away from the perforations in the trough *d* in full streams or only running therefrom slowly, according to the capacity of the apparatus, which is dependent upon the relative heat of the cooling-liquid and the liquid to be cooled, and said perforated screen or receptacle within the said trough also retains any scum, hops, or other foreign matter when any such are contained in the liquid to be cooled.

If in the vertical range of horizontal pipes the said pipes were any considerable distance apart—say half an inch or an inch—the liquid to be cooled would be apt to accumulate at places along the under side of one pipe, and not distribute uniformly upon the next pipe below, and if round pipes are brought too closely together, the viscid nature of the beer is such that the cohesive attraction is not sufficient to cause the liquid to pass directly to the lower side of the pipe and pass down to the next, but a thin film of beer will form from one pipe to the next, and hence will not be maintained in contact with the entire cooling-surface. To obviate these difficulties, the aforesaid teeth or downward projections are provided, by which the body of the pipes can be sufficiently far apart to avoid the last-named difficulty, and the distribution is effected with uniformity, avoiding the first-named objection.

What is claimed as the invention of the said JEAN LOUIS BAUDELOT is—

1. Directing the trickling liquid to be cooled from the bottom of one pipe to the next below it by means of a downward projection, substantially as described, whereby the distribution of the liquid to be cooled is more uniformly maintained and the contact thereof with the whole cooling-surface secured, as set forth.

2. A trough with perforations for supplying the liquid to be cooled, when combined with a screen or perforated receptacle within said trough for detaining any foreign substance, or for equalizing the distribution in said trough of the liquid to be cooled, as specified.

Dated this 10th day of January, 1862.

H. MIGEON,
*Assignee of Jean Louis Baudelot.*

Witnesses:
LEMUEL W. SERRELL,
THOS. GEO. HAROLD.